Figure 1:
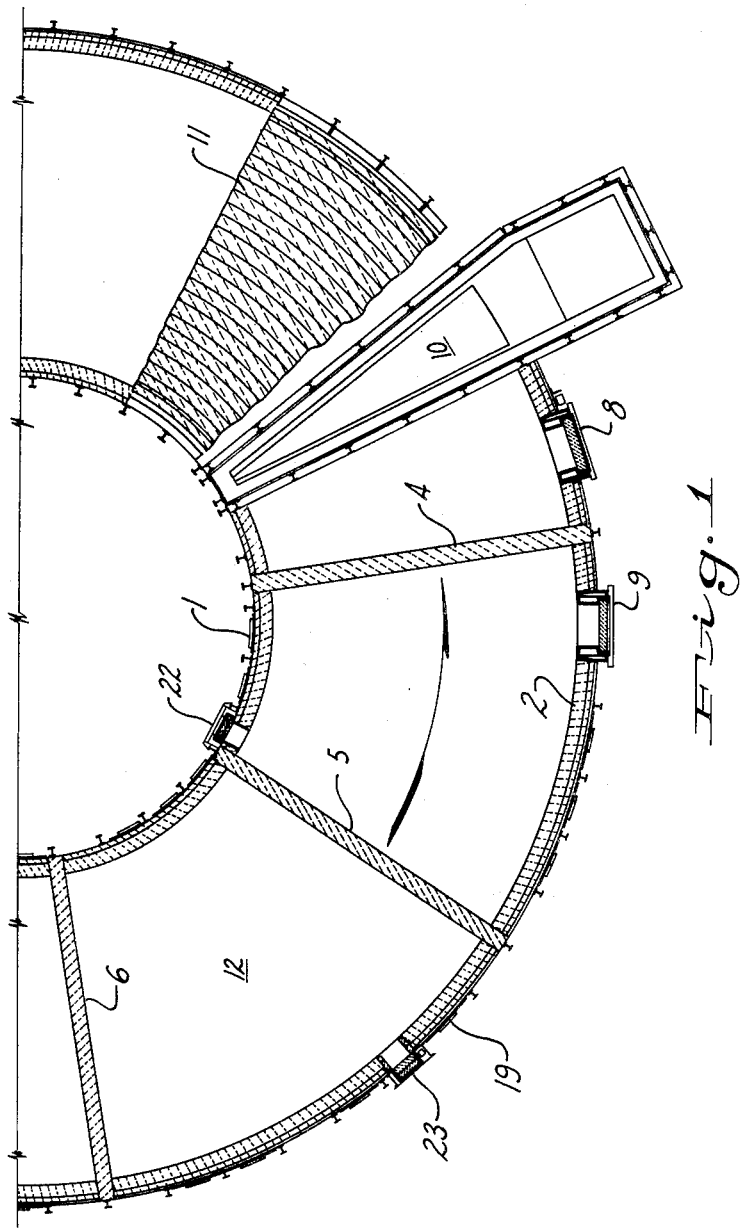

Dec. 23, 1952 A. D. DAUCH 2,622,863
ROTARY HEARTH FURNACE
Filed May 29, 1950 2 SHEETS—SHEET 1

INVENTOR.
Alan W. Dauch
BY William B. Jaspert
Attorney

Dec. 23, 1952            A. D. DAUCH            2,622,863
ROTARY HEARTH FURNACE
Filed May 29, 1950                                2 SHEETS—SHEET 2
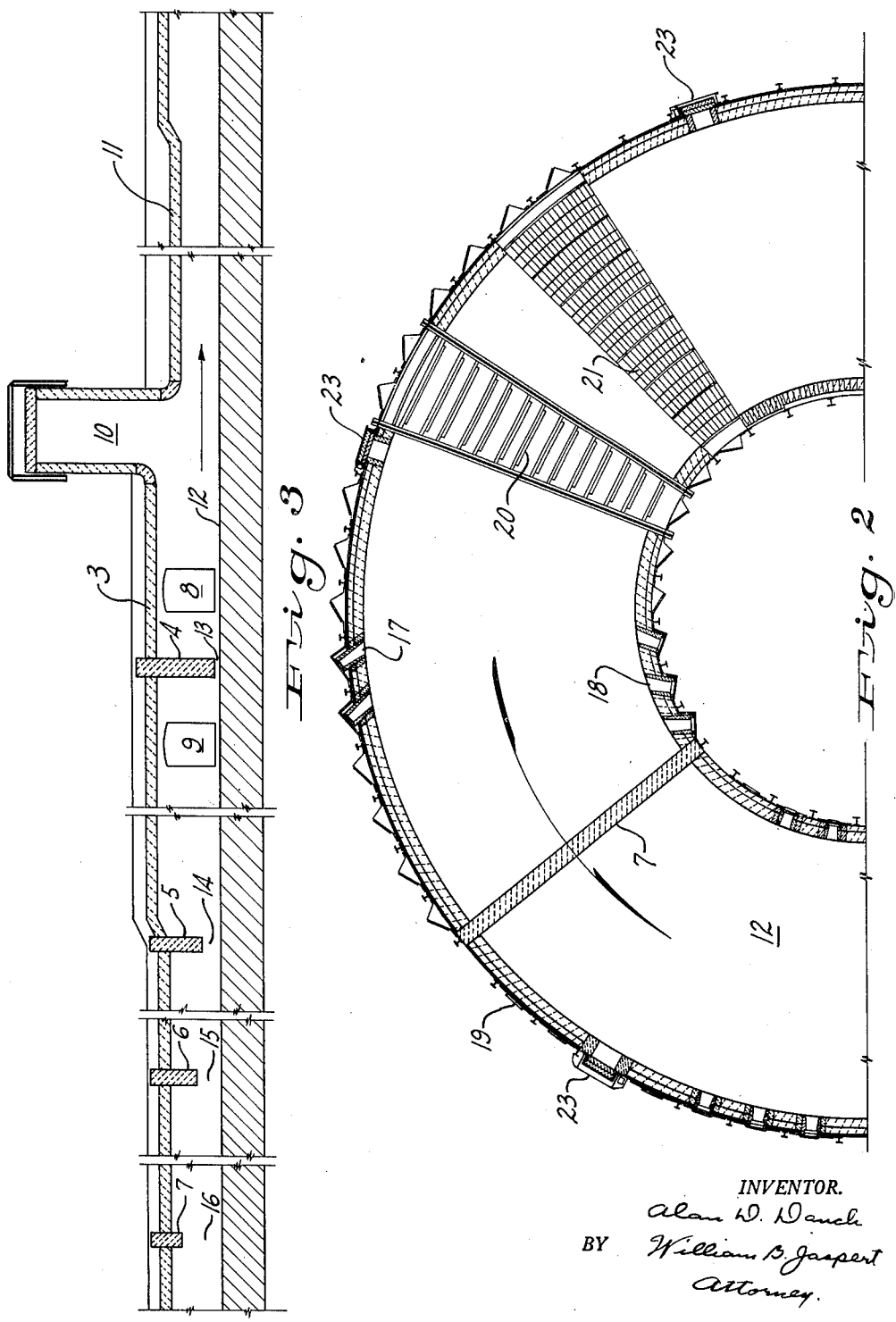
INVENTOR.
Alan W. Dauch
BY William B. Jaspert
Attorney.

Patented Dec. 23, 1952

2,622,863

UNITED STATES PATENT OFFICE 2,622,863

ROTARY HEARTH FURNACE

Alan D. Dauch, Pittsburgh, Pa.

Application May 29, 1950, Serial No. 165,007

3 Claims. (Cl. 263—28)

This invention relates to new and useful improvements in rotary heating furnaces, more particularly billet heating furnaces having a capacity for heating up to one hundred tons of steel billets per hour.

It is among the objects of this invention to provide a rotary hearth furnace into which steel billets are continually charged and from which such billets are discharged at charge and discharge stations that are side by side with a partition wall therebetween, having a maximum furnace temperature at the discharge station and the minimum at the charging station.

It is a further object of the invention to provide a rotary hearth furnace of the above designated character in which the products of combustion are removed from the charging end of the furnace in a manner to cause a wiping contact with the relatively cold metal charged into the furnace to effect maximum heat absorption for preheating the charge and obtain a minimum temperature of the waste gases passing to the stack.

It is a further object of the invention to provide a rotary hearth furnace for heating steel billets or the like in which the annular heating chamber is partitioned to provide different temperature zones whereby set temperatures may be maintained in such zones to prevent shock to the metal passing from zone to zone, which is particularly critical in some alloy steels.

It is still a further object of the invention to provide a rotary hearth furnace of the above designated character having tangential and radial burner openings and inspection openings throughout the major portion of the furnace walls to provide for the efficient heating of the furnace chamber.

The invention will become more apparent from a consideration of the accompanying drawing, constituting a part hereof, in which like reference characters designate like parts, and in which:

Fig. 1 is a top plan view of one-half of a rotary hearth heating furnace embodying the principles of this invention;

Fig. 2 a similar view of the other half of the furnace; and

Fig. 3 a vertical cross-sectional view of a projection of the walls of the furnace.

With reference to the several figures of the drawings, numeral 1 generally designates the inner wall and 2 the outer wall of an annular furnace chamber having a flat arched roof generally designated by the numeral 3, Fig. 3. The furnace is divided into heating zones by partitions 4, 5, 6 and 7, the partition 4 being disposed between a charging door 8 and a discharge door 9, and a stack uptake, generally designated by the numeral 10, is on the charging side of the furnace chamber, as is more clearly shown in Fig. 3.

A prime feature of the invention is the provision of a low flat arched roof 11 that extends a substantial distance from the stack uptake 10 of the furnace for the purpose of reducing the area of the furnace chamber so that the gasses passing to the stack uptake 10 are lowered to contact with the cold billets that have been charged into the furnace through the door 8 and are traveling on the rotary hearth in the direction designated by the arrow below the stack uptake 10.

The partition 4 extends a substantial distance to the hearth, the numeral 12 designating the hearth line or the surface on which steel billets are charged. The space below the partition 4, designated by the numeral 13, is such that a positive pressure is maintained at the discharge door 9 to prevent the ingress of air through the discharge opening 9 when billets are removed from the furnace. In other words, the pressure prevailing on the charging side of the furnace will counteract the low pressure atmosphere on the discharge side of the partition 4, thus preventing a vacuum which would draw air into the furnace through the discharge opening 9.

The partitions 5, 6 and 7 have graduated openings 14, 15 and 16 increasing with the temperature drop in the zones beginning from the discharge zone of the furnace to the charging end. Thus, for example, if the billets are heated to a temperature of 2250° F. at which they are discharged from the furnace door 9, the temperature in the zone between the partitions 4 and 5 may be slightly higher, or 2300° F. The temperature between partitions 5 and 6 would be about 2250° F.; the temperature between partitions 6 and 7 2200° F., and from partition 7 to the stack uptake 10 it would gradually lower to where it is discharged to the stack at a temperature between 1600° and 1800° F. By means of the lowered roof arch 11 causing the wiping action of the products of combustion on the freshly charged billets, a substantial temperature drop is effected in this zone to incur a minimum heat loss and obtain maximum efficiency in heating, which in actual practice has resulted in very substantial savings of gas. The furnace is heated by a series of burners 17 and 18, some of which are tangentially disposed and others, like the burners 19, are radially disposed, depending upon the proximity of a partition wall.

The details of arch 11 are shown in Fig. 1 of the drawing and a sector showing the arch steel, designated by the numeral 20, and the refractory flat arch construction 21 is shown in Fig. 2 of the drawing. The steel and refractory construction shown in the two sectors is illustrative only and is the construction carried out throughout the entire roof or arch of the furnace. Numerals 22 and 23 designate service openings for inspection of the furnace chamber.

It is evident from the foregoing description of the invention that rotary heating furnaces constructed in accordance therewith provide for the efficient heating of billets in large volumes giving the furnace maximum heating capacity and utilizing most of the heat of the products of combustion in their passage to the stack. By virtue of the varying temperature from the high temperature at the discharge zone of the furnace, gradually reducing throughout the 360 degrees to the stack zone of the furnace, with the graduated spaces in the baffle walls, provide for a gradual and natural stack draft causing uniform flow of the gases from one zone to the other and eventually bringing them in wiping contact for efficient heat exchange with the freshly charged steel billets.

Although one embodiment of the invention has been herein illustrated and described, it will be evident to those skilled in the art that various modifications may be made in the details of construction without departing from the principles herein set forth.

I claim:

1. In a rotary furnace, an annular hearth mounted for rotation between an inner and outer cylindrical wall, a flat arch roof extending between the furnace walls to provide a furnace chamber of substantially rectangular shape through any transverse section radially of the hearth and walls, a pair of adjacent openings in a wall of said furnace for charging and discharging articles to be heated, and a stack adjacent the charging opening, the flat arch roof of the furnace being of different height, with the maximum height section at the charging and discharging openings, the minimum height section extending a substantial distance beyond the stack in the direction of the hearth movement, and a medium intermediate height section throughout the main portion that extends a greater distance than the distance of the minimum height section of the furnace chamber.

2. In a rotary furnace, an annular hearth mounted for rotation between an inner and outer cylindrical wall, a flat arch roof extending between the furnace walls to provide a furnace chamber of substantially rectangular shape through any transverse section radially of the hearth and walls, a pair of adjacent openings in a wall of said furnace for charging and discharging articles to be heated, a stack adjacent the charging opening, the flat arch roof of the furnace being of different height with the maximum height section at the charging and discharging openings, the minimum height section extending a substantial distance beyond the stack in the direction of the hearth movement, and a medium intermediate height section throughout the main portion that extends a greater distance than the distance of the minimum height section of the furnace chamber, and a fixed partition wall suspended from the roof of the furnace dividing the furnace chamber between the charge and discharge openings to maintain a pressure balance between the high and low temperature zones.

3. In a rotary furnace, an annular hearth mounted for rotation between an inner and outer cylindrical wall, a flat arch roof extending between the furnace walls to provide a furnace chamber of substantially rectangular shape through any transverse section radially of the hearth and walls, a pair of adjacent openings in a wall of said furnace for charging and discharging articles to be heated, a stack adjacent the charging opening, the flat arch roof of the furnace being of different height with the maximum height section at the charging and discharging openings, the minimum height section extending a substantial distance beyond the stack in the direction of the hearth movement, and a medium intermediate height section throughout the main portion that extends a greater distance than the distance of the minimum height section of the furnace chamber, a fixed partition wall suspended from the roof of the furnace dividing the furnace chamber between the charge and discharge openings to maintain a pressure balance between the high and low temperature zones, and a plurality of fixed partition walls of different lengths suspended from the furnace roof throughout the section of medium height, said partition walls reducing in length in the direction opposite the direction of hearth movement to maintain substantially constant velocity of the products of combustion in their flow through the annular furnace chamber.

ALAN D. DAUCH.

REFERENCES CITED

The following references are of record in the file of this patent:

UNITED STATES PATENTS

| Number | Name | Date |
| --- | --- | --- |
| 1,569,923 | Gudmundson et al. | Jan. 19, 1926 |
| 1,914,717 | Heuer | June 20, 1933 |
| 2,296,791 | Keener et al. | Sept. 22, 1942 |

FOREIGN PATENTS

| Number | Country | Date |
| --- | --- | --- |
| 898,099 | France | Apr. 10, 1945 |
| 588,238 | Germany | Nov. 17, 1933 |